(12) United States Patent
Zhou

(10) Patent No.: US 9,703,033 B2
(45) Date of Patent: Jul. 11, 2017

(54) LIGHT GUIDE PLATE WITH VFARIABLE ANGLED MINUTE REFLECTION PROJECTION, BACKLIGHT MODULE HAVING THE SAME, AND DISPLAY DEVICE HAVING THE SAME

(71) Applicant: Shenzhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 271 days.

(21) Appl. No.: 14/412,685

(22) PCT Filed: Dec. 9, 2014

(86) PCT No.: PCT/CN2014/093330
§ 371 (c)(1),
(2) Date: Jan. 4, 2015

(87) PCT Pub. No.: WO2016/082248
PCT Pub. Date: Jun. 2, 2016

(65) Prior Publication Data
US 2016/0363714 A1  Dec. 15, 2016

(30) Foreign Application Priority Data

Nov. 26, 2014  (CN) .......................... 2014 1 0705605

(51) Int. Cl.
*F21V 8/00* (2006.01)

(52) U.S. Cl.
CPC ......... *G02B 6/0058* (2013.01); *G02B 6/0043* (2013.01); *G02B 6/0055* (2013.01); *G02B 6/0061* (2013.01); *G02B 6/0068* (2013.01)

(58) Field of Classification Search
CPC .. G02B 6/0035; G02B 6/0036; G02B 6/0043; G02B 6/0058; G02B 6/0061; G02B 6/0073; G02B 6/0055
See application file for complete search history.

(56) References Cited

U.S. PATENT DOCUMENTS

2007/0236957 A1* 10/2007 Koganezawa ....... G02B 6/0036
362/561
2009/0097273 A1* 4/2009 Chang .................. G02B 6/0055
362/618

(Continued)

*Primary Examiner* — Anh Mai
*Assistant Examiner* — Steven Horikoshi
(74) *Attorney, Agent, or Firm* — Andrew C. Cheng

(57) ABSTRACT

A light guide plate includes a light exit surface, a reflection surface opposite to the light exit surface, and at least one light incidence surface connecting to the light exit surface and the reflection surface. The reflection surface includes a plurality of minute projection structures projecting toward interior of the light guide plate. Each of the minute projection structures includes at least two side faces coated with a high reflectivity material. The at least two high reflectivity material coated side faces form at least one included angle pointing toward the at least one light incidence surface. With the distance of the minute projection structure from the closest light source getting shorter, the at least one included angle formed thereby is getting smaller.

20 Claims, 3 Drawing Sheets

(56) References Cited

U.S. PATENT DOCUMENTS

2010/0027293 A1\* 2/2010 Li .................... G02B 6/002
  362/619
2011/0205756 A1\* 8/2011 Kim .................. G02B 6/0053
  362/607

\* cited by examiner

LIGHT GUIDE PLATE WITH VFARIABLE ANGLED MINUTE REFLECTION PROJECTION, BACKLIGHT MODULE HAVING THE SAME, AND DISPLAY DEVICE HAVING THE SAME

CROSS REFERENCE TO RELATED APPLICATIONS

This application claims the priority of Chinese Patent Application No. 201410705605.0, entitled "Light Guide Plate, Backlight Module, and Display Device", filed on Nov. 26, 2014, the disclosure of which is incorporated herein by reference in its entirety.

BACKGROUND OF THE INVENTION

1. Field of the Invention

The present invention relates to the field of displaying technology, and in particular to a light guide plate, a backlight module, and a display device.

2. The Related Arts

In the field of displaying technology, the most commonly seen display devices are liquid crystal displays (LCDs). Liquid crystal polymer used in the liquid crystal displays does not have the property of luminosity and can achieve an effect of displaying relying upon light emitting from a backlight module. Generally, a backlight module comprises a light guide plate and multiple spot light sources. Light emitting from the multiple spot light sources, after being subjected to reflection and scattering by microstructures formed on the light guide plate, is given off in a uniform manner from a light exit surface of the light guide plate.

Heretofore, on the one hand, due to the loss of light during the transmission thereof, the brightness of light that is given off a portion of the light exit surface of a light guide plate that is distant from a light source is reduced so as to make the light exiting from the light guide plate not uniform; and on the other hand, since a spot light source has a specific light exiting angle, a portion of the light exit surface of a light guide plate that corresponds to a gap between two spot light sources may become a dark zone, further making the light exiting from the light guide plate further non-uniform.

SUMMARY OF THE INVENTION

Embodiments of the present invention provide a light guide plate, a backlight module, and a display device, which help improve uniformity of light exiting from the light guide plate and reduce optic loss.

In a first aspect, an embodiment of the preset invention provides a light guide plate, which comprises a light exit surface, a reflection surface opposite to the light exit surface, and at least one light incidence surface connecting to the light exit surface and the reflection surface, wherein the reflection surface comprises a plurality of minute projection structures projecting toward interior of the light guide plate, each of the minute projection structures comprising at least two side faces coated with a high reflectivity material, the at least two high reflectivity material coated side faces forming at least one included angle pointing toward the at least one light incidence surface, and with a distance of the minute projection structure from a closest light source getting shorter, the at least one included angle formed thereby gets smaller.

Optionally, the light guide plate further comprises two side surfaces connecting to the light exit surface, the reflection surface, and the at least one light incidence surface, the two side surfaces of the light guide plate respectively forming two included angles that are less than 90° with respect to the at least two high reflectivity material coated side faces of each of the minute projection structures.

Optionally, the light guide plate comprises one light incidence surface; and the minute projection structures each comprise two high reflectivity material coated side faces in such a way that the two high reflectivity material coated side faces define an included angle pointing toward the light incidence surface and with a distance of the minute projection structure from the closest light source getting shorter, the included angle formed thereby gets smaller.

Optionally, the minute projection structures each have a shape of one of a triangular pyramid, a triangular prism, and a triangular frustum.

Optionally, the light guide plate comprises two opposite light incidence surfaces;

the minute projection structures each comprise four high reflectivity material coated side faces and the four high reflectivity material coated side faces define two included angles respectively pointing toward the two opposite light incidence surface and with a distance of the minute projection structure from the closest light source getting shorter, the two included angles formed thereby get smaller.

Optionally, the minute projection structures each have a shape of one of a quadrangular pyramid, a quadrangular prism, and a quadrangular frustum.

Optionally, the minute projection structures have a distance therebetween that is 50 µm-500 µm.

Optionally, the minute projection structures each have a base having an edge length that is 50 µm-100 µm.

In a second aspect, an embodiment of the present invention provides a backlight module, which comprises a light guide plate and a plurality of light sources. The plurality of light sources is distributed along at least one light incidence surface of the light guide plate.

In a third aspect, an embodiment of the present invention provides a display device that comprises a backlight module of the second aspect.

In an embodiment of the present invention, the light guide plate comprises a plurality of minute projection structures formed on a reflection surface thereof and each minute projection structure has at least two side faces coated with a high reflectivity material. The at least two side faces define at least one included angle pointing toward a light incidence surface of the light guide plate so as to reflect incident light to locations that correspond to gaps between light sources to prevent formation of dark zones at locations of the light guide plate corresponding to the gaps between the light sources. With the distances of the minute projection structures from the closest light source getting shorter, the at least one included angle formed thereby and pointing toward the light incidence surface is getting smaller so that more of light at locations close to the light sources is reflected to locations away from the light sources to further enhance uniformity of exiting light of the light guide plate.

BRIEF DESCRIPTION OF THE DRAWINGS

To more clearly explain the technical solution proposed in an embodiment of the present invention and that of the prior art, brief descriptions of the drawings that are necessary for describing the embodiment or the prior art are given as follows. It is obvious that the drawings that will be described below show only some embodiments of the present inven

DETAILED DESCRIPTION OF THE PREFERRED EMBODIMENTS

A clear and complete description will be given to technical solutions of embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Embodiments of the present invention provide a light guide plate, a backlight module, and a display device, which help improve uniformity of light exiting from the light guide plate and reduce optic loss. A detailed description will be given to the embodiments of the present invention with reference to the attached drawings.

Figure 1:
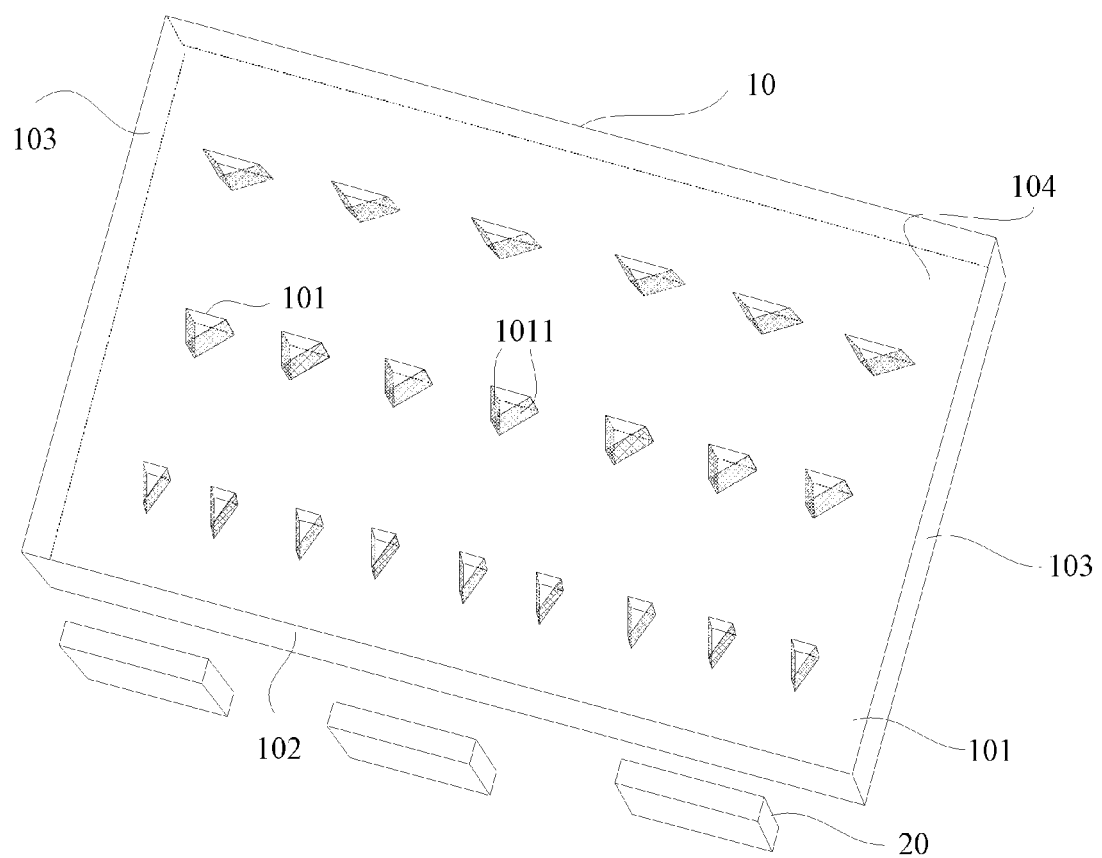
- FIG. 1 is a schematic view showing the structure of a light guide plate according to an embodiment of the present invention.

Referring to FIG. 1, a schematic view is given to illustrate an example of a light guide plate according to an embodiment of the present invention. As shown in FIG. 1, the light guide plate 10 comprises a light exit surface, a reflection surface 104 that is opposite to the light exit surface, and at least one light incidence surface 102 connected to the light exit surface and the reflection surface 104. The reflection surface 104 comprises a plurality of minute projection structures 101 projecting toward interior of the light guide plate 10. Each of the minute projection structures 101 comprises at least two side faces 1011 coated with a high reflectivity material. The at least two high reflectivity material coated side faces 1011 define at least one included angle α pointing toward the at least one light incidence surface 102. The shorter the distance of a minute projection structure 101 from a closest light source 20 is, the smaller the at least one included angle α formed thereby is.

Figure 2:
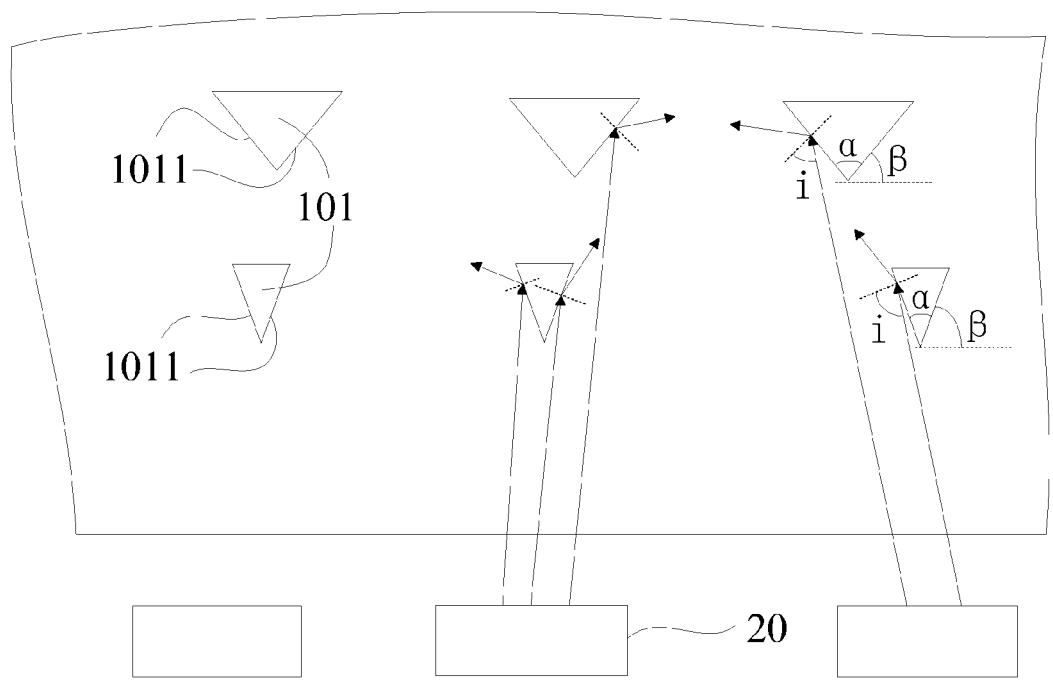
FIG. 2 is a schematic view showing the structure of a light guide plate according to another embodiment of the present invention.

Referring also to FIG. 2, as shown in FIG. 2, light sources 20 emitting light that, after being reflected by the at least two side faces 1011 of each of the minute projection structures 101, irradiate in a direction toward a location corresponding to a gap between the light sources 20 and away from the light sources 20 so as to enhance the exiting light brightness of the light guide plate at the location corresponding to the gap between the light sources 20 and thus preventing the formation of a dark zone.

When the included angle α that is formed by the at least two high reflectivity material coated side faces 1011 gets smaller, meaning an included angled formed between one of the side faces 1011 of the minute projection structure 101 and the closest light incidence 102 gets larger, the incidence angle i of light gets lager and thus the reflection angle gets larger, so that the direction toward which the light is reflected is further deviated from the light sources 20. Thus, a smaller included angle α at a location closer to the light sources 20 would better reflect light toward a direction deviating from the light sources 20 to supplement the brightness of light at a location away from the light sources 20; while a larger included angle α at a location away from the light sources 20 would prevent reflection of light toward edges of the light guide plate 10 to thus cause light leakage.

Further, as shown in FIG. 2, the light guide plate 10 further comprises two side surfaces 103 connected to the light exit surface, the reflection surface 104, and the at least one light incidence surface 102. The two side surfaces 103 of the light guide plate respectively define included angles that is less than 90° with respect to the at least two high reflectivity material coated side faces 1011 of each of the minute projection structures 101.

In some feasible embodiments, the light guide plate 10 comprises one light incidence surface 102; and in this condition, the minute projection structures 101 each comprise two side faces 1011 coated with the high reflectivity material and the two high reflectivity material coated side faces 1011 define an included angle pointing toward the light incidence surface 102. The shorter the distance of the minute projection structure 101 from the closest light source 20 is, the smaller the included angle α formed thereby is.

Optionally, the minute projection structures 101 may have a shape that is at least one of a triangular pyramid, a triangular prism, and a triangular frustum.

Figure 3:
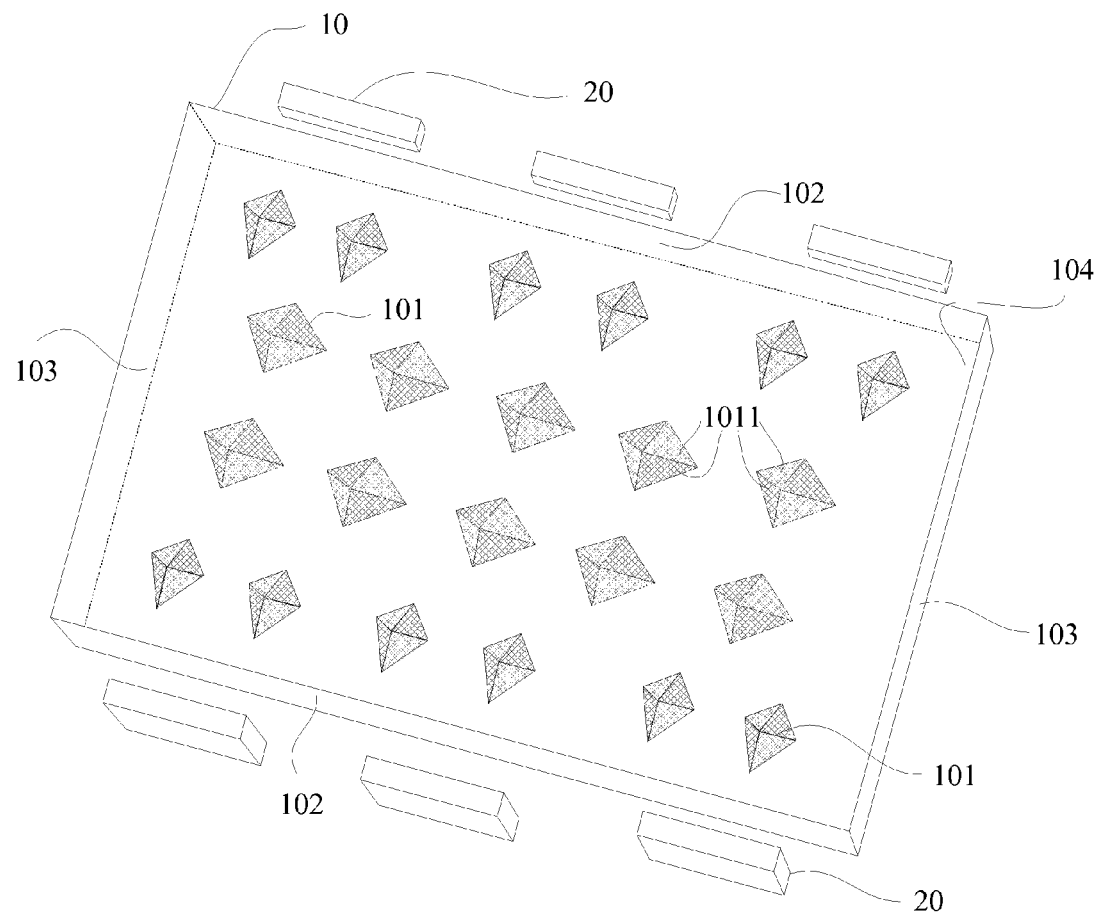
FIG. 3 is a schematic view showing the structure of a light guide plate according to a further embodiment of the present invention.

In another feasible embodiments, as shown in FIG. 3, the light guide plate 10 comprises two opposite light incidence surfaces 102; and in this condition, the minute projection structures 101 each comprise four side faces 1011 that are coated with a high reflectivity material and the four high reflectivity material coated side faces 1011 define two included angles α respectively pointing toward the two opposite light incidence surfaces 102. The shorter the distance of the minute projection structure 101 from the closest light source 20 is, the smaller the two included angles α formed thereby are.

Optionally, the minute projection structures 101 may have a shape that is at least one of a quadrangular pyramid, a quadrangular prism, and a quadrangular frustum.

In an embodiment, since the minute projection structures 101 exhibit an effect of absorbing light to some extents, to prevent light from being further weakened at the location correspond to the gap between the light sources 20, the minute projection structures 101 may be arranged to correspond to the light sources 20. Specifically, the minute projection structures 101 that are arranged at locations corresponding to the gaps between the light sources 20 of the light guide plate 10 have a smaller density or no minute projection structure 101 is arranged at a location corresponding to the gap between the light sources 20 of the light guide plate 10.

Figure 4:
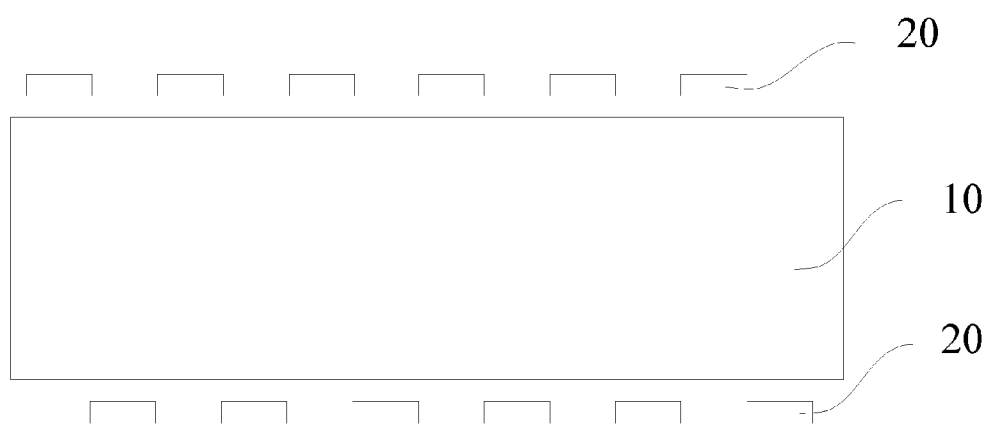
FIG. 4 is a schematic view showing the structure of a light guide plate according to yet a further embodiment of the present invention.

In an embodiment, as shown in FIG. 4, the light sources 20 are respectively set at two opposite light incidence surface 102 of the light guide plate 10 in a manner of being alternate with each other.

In an embodiment, a distance between the minute projection structures 101 is set to be 50 μm-500 μm. An edge length of a base of the minute projection structure 101 can be set to be 50 μm-100 μm. The base of the minute projection structure 101 is a side of the minute projection structure 101 that intersects the reflection surface 104 of the light guide plate 10.

The light guide plate according to embodiments of the present invention comprises a plurality of minute projection structures formed on the reflection surface and each of the minute projection structures has at least two side faces coated with a high reflectivity material with the at least two side faces defining at least one included angle pointing toward the light incidence surface of the light guide plate to thereby reflect incident light to a location corresponding to a gap between light sources to prevent formations of dark zones at the locations corresponding to the gaps of the light sources. The shorter the distances of the minute projection structures from the closest light source are, the smaller the included angles formed thereby are. Thus, at a location closer to the light sources, more light is reflected toward a location away from the light sources thereby further improving uniformity of exiting light of the light guide plate.

Correspondingly, an embodiment of the present invention further provides a backlight module and the backlight module comprises a light guide plate of one of the embodiments shown in FIGS. 1-4.

Correspondingly, an embodiment of the present invention further provides a display device and the display device comprises the above-described backlight module.

The backlight module and display device provided by the present invention may reflect light to locations that correspond to gaps between light sources in a direction away from the light sources and reduce loss resulting from light being absorbed at locations of the light guide plate away from the light sources and thus enhance uniformity of light emitting therefrom.

The embodiments illustrated above are not construed as limiting the scope of protection of the technical solutions. Modifications, equivalent substitutions, and improvements that are made without departing from the spirits and principles of the above-described embodiments are considered within the scope of protection of the technical solutions.

What is claimed is:

1. A light guide plate, comprising a light exit surface, a reflection surface opposite to the light exit surface, and at least one light incidence surface connecting to the light exit surface and the reflection surface, wherein
the reflection surface comprises a plurality of minute projection structures projecting toward interior of the light guide plate, each of the minute projection structures comprising at least two side faces coated with a high reflectivity material, the at least two high reflectivity material coated side faces forming at least one included angle pointing toward the at least one light incidence surface, and with a distance of the minute projection structure from a closest light source getting shorter, the at least one included angle formed thereby gets smaller;
wherein the plurality of minute projection structures are arranged into groups at different distances from the at least one light incidence surface, each of the groups comprising multiple ones of the plurality of minute projection structures, the multiple minute projection structures of each of the groups being arranged in a linear array that is substantially parallel to the at least one light incidence surface with the included angles of the multiple minute projection structures being identical and pointing toward the at least one light incidence surface, wherein the included angles of the multiple minute projection structures of each of the groups are such that the included angles get smaller with the distance of the group from the at least one light incidence surface getting shorter.

2. The light guide plate as claimed in claim 1, wherein the light guide plate further comprises two side surfaces connecting to the light exit surface, the reflection surface, and the at least one light incidence surface, the two side surfaces of the light guide plate respectively forming two included angles that are less than 90° with respect to the at least two high reflectivity material coated side faces of each of the minute projection structures.

3. The light guide plate as claimed in claim 1, wherein
the at least one light incidence surface comprises a first light incidence surface; and
the minute projection structures each comprise the two high reflectivity material coated side faces in such a way that the two high reflectivity material coated side faces define an included angle pointing toward the first light incidence surface and with a distance of the minute projection structure from the closest light source getting shorter, the included angle formed thereby gets smaller.

4. The light guide plate as claimed in claim 3, wherein the minute projection structures each have a shape of one of a triangular pyramid, a triangular prism, and a triangular frustum.

5. The light guide plate as claimed in claim 1, wherein
the light guide plate comprises two opposite light incidence surfaces;
the minute projection structures each comprise four high reflectivity material coated side faces and the four high reflectivity material coated side faces define two included angles respectively pointing toward the two opposite light incidence surfaces and with a distance of the minute projection structure from the closest light source getting shorter, the two included angles formed thereby get smaller.

6. The light guide plate as claimed in claim 5, wherein the minute projection structures each have a shape of one of a quadrangular pyramid, a quadrangular prism, and a quadrangular frustum.

7. The light guide plate as claimed in claim 1, wherein the minute projection structures have a distance therebetween that is 50 μm-500 μm.

8. The light guide plate as claimed in claim 1, wherein the minute projection structures each have a base having an edge length that is 50 μm-100 μm.

9. A backlight module, comprising a light guide plate and a plurality of light sources distributed along at least one light incidence surface of the light guide plate, the light guide plate comprising a light exit surface, a reflection surface opposite to the light exit surface, and at least one light incidence surface connecting to the light exit surface and the reflection surface, wherein
the reflection surface comprises a plurality of minute projection structures projecting toward interior of the light guide plate, each of the minute projection structures comprising at least two side faces coated with a high reflectivity material, the at least two high reflectivity material coated side faces forming at least one included angle pointing toward the at least one light incidence surface, and with a distance of the minute projection structure from a closest light source getting shorter, the at least one included angle formed thereby gets smaller;
wherein the plurality of minute projection structures are arranged into groups at different distances from the at least one light incidence surface, each of the groups comprising multiple ones of the plurality of minute projection structures, the multiple minute projection structures of each of the groups being arranged in a linear array that is substantially parallel to the at least one light incidence surface with the included angles of the multiple minute projection structures being identical and pointing toward the at least one light incidence surface, wherein the included angles of the multiple minute projection structures of each of the groups are such that the included angles get smaller with the distance of the group from the at least one light incidence surface getting shorter.

10. The backlight module as claimed in claim 9, wherein the light guide plate further comprises two side surfaces connecting to the light exit surface, the reflection surface, and the at least one light incidence surface, the two side surfaces of the light guide plate respectively forming two included angles that are less than 90° with respect to the at least two high reflectivity material coated side faces of each of the minute projection structures.

11. The backlight module as claimed in claim 9, wherein the at least one light incidence surface comprises a first light incidence surface; and
the minute projection structures each comprise the two high reflectivity material coated side faces in such a way that the two high reflectivity material coated side faces define an included angle pointing toward the first light incidence surface and with a distance of the minute projection structure from the closest light source getting shorter, the included angle formed thereby gets smaller.

12. The backlight module as claimed in claim 11, wherein the minute projection structures each have a shape of one of a triangular pyramid, a triangular prism, and a triangular frustum.

13. The backlight module as claimed in claim 9, wherein the light guide plate comprises two opposite light incidence surfaces;
the minute projection structures each comprise four high reflectivity material coated side faces and the four high reflectivity material coated side faces define two included angles respectively pointing toward the two opposite light incidence surfaces of the light guide plate and with a distance of the minute projection structure from the closest light source getting shorter, the two included angles formed thereby get smaller.

14. The backlight module as claimed in claim 13, wherein the minute projection structures each have a shape of one of a quadrangular pyramid, a quadrangular prism, and a quadrangular frustum.

15. A display device, comprising at least one backlight module, the backlight module comprising a light guide plate and a plurality of light sources distributed along at least one light incidence surface of the light guide plate, the light guide plate comprising a light exit surface, a reflection surface opposite to the light exit surface, and at least one light incidence surface connecting to the light exit surface and the reflection surface, wherein
the reflection surface comprises a plurality of minute projection structures projecting toward interior of the light guide plate, each of the minute projection structures comprising at least two side faces coated with a high reflectivity material, the at least two high reflectivity material coated side faces forming at least one included angle pointing toward the at least one light incidence surface, and with a distance of the minute projection structure from a closest light source getting shorter, the at least one included angle formed thereby gets smaller;
wherein the plurality of minute projection structures are arranged into groups at different distances from the at least one light incidence surface, each of the groups comprising multiple ones of the plurality of minute projection structures, the multiple minute projection structures of each of the groups being arranged in a linear array that is substantially parallel to the at least one light incidence surface with the included angles of the multiple minute projection structures being identical and pointing toward the at least one light incidence surface, wherein the included angles of the multiple minute projection structures of each of the groups are such that the included angles get smaller with the distance of the group from the at least one light incidence surface getting shorter.

16. The display device as claimed in claim 15, wherein the light guide plate further comprises two side surfaces connecting to the light exit surface, the reflection surface, and the at least one light incidence surface, the two side surfaces of the light guide plate respectively forming two included angles that are less than 90° with respect to the at least two high reflectivity material coated side faces of each of the minute projection structures.

17. The display device as claimed in claim 15, wherein the at least one light incidence surface comprises a first light incidence surface; and
the minute projection structures each comprise the two high reflectivity material coated side faces in such a way that the two high reflectivity material coated side faces define an included angle pointing toward the first light incidence surface and with a distance of the minute projection structure from the closest light source getting shorter, the included angle formed thereby gets smaller.

18. The display device as claimed in claim 17, wherein the minute projection structures each have a shape of one of a triangular pyramid, a triangular prism, and a triangular frustum.

19. The display device as claimed in claim 15, wherein the light guide plate comprises two opposite light incidence surfaces;
the minute projection structures each comprise four high reflectivity material coated side faces and the four high reflectivity material coated side faces define two included angles respectively pointing toward the two opposite light incidence surfaces of the light guide plate and with a distance of the minute projection structure from the closest light source getting shorter, the two included angles formed thereby get smaller.

20. The display device as claimed in claim 19, wherein the minute projection structures each have a shape of one of a quadrangular pyramid, a quadrangular prism, and a quadrangular frustum.

* * * * *